US006719626B2

(12) United States Patent
Federowich

(10) Patent No.: US 6,719,626 B2
(45) Date of Patent: Apr. 13, 2004

(54) AXIAL FLOW COMBINE AND IMPELLER FOR ROTOR THEREOF

(76) Inventor: Joe Edward Federowich, R.R. 2, Ashville, Manitoba (CA), R0L 0A0

( * ) Notice: Subject to any disclaimer, the term of this patent is extended or adjusted under 35 U.S.C. 154(b) by 0 days.

(21) Appl. No.: 10/132,265

(22) Filed: Apr. 26, 2002

(65) Prior Publication Data

US 2003/0203748 A1 Oct. 30, 2003

(51) Int. Cl.[7] ................................................ A01F 12/20
(52) U.S. Cl. .......................................... 460/70; 460/16
(58) Field of Search .............................. 460/16, 70, 68, 460/66, 80, 69, 59, 79

(56) References Cited

U.S. PATENT DOCUMENTS

| 3,537,460 | A | * | 11/1970 | Buskirk ........................ 460/68 |
| 5,045,025 | A | | 9/1991 | Underwood |
| 5,125,871 | A | | 6/1992 | Gorden |
| 5,387,153 | A | * | 2/1995 | Tanis ............................ 460/68 |
| 5,497,605 | A | | 3/1996 | Underwood |
| 6,050,894 | A | | 4/2000 | Johnson |

* cited by examiner

Primary Examiner—Thomas B. Will
Assistant Examiner—Meredith Petravick
(74) Attorney, Agent, or Firm—Norman M. Cameron

(57) ABSTRACT

An axial flow combine harvester having a combination impeller and rotor. The rotor has a front end and is rotatable in a specified rotational direction during normal operation of the combine harvester. The impeller comprises a front, a rear, a mount for fitting the impeller on the rotor with the rear of the impeller adjacent to the front end of the rotor, and a pair of impeller blades extending radially outwards from the mount. The impeller blades are hook-shaped when viewed from the front end of the impeller with outer ends projecting in the rotational direction of the rotor.

33 Claims, 9 Drawing Sheets

AXIAL FLOW COMBINE AND IMPELLER FOR ROTOR THEREOF

BACKGROUND OF THE INVENTION

This invention relates to combine harvesters and, in particular, to rotors for axial flow combine harvesters.

Axial flow combine harvesters offer superior performance in harvesting grain crops. These harvesters typically employ a rotor, usually orientated fore and aft, in the harvester. The rotor has a plurality of projections which thresh the crop as the crop passes along the rotor. There is usually an impeller at the front of the rotor which has the task of orienting the crop properly and feeding it towards the rotor. However some crops ball up or knot instead of feeding properly towards the rotor. For example, this typically occurs with crops such as hemp.

U.S. Pat. No. 5,497,605 to Underwood shows a hook-shaped impeller blade.

U.S. Pat. No. 5,125,871 to Gorden shows an impeller with a space behind the blades. This is also shown in U.S. Pat. No. 3,982,548 to DePauw et al.

U.S. Pat. No. 5,045,025 to Underwood shows hook-shaped impeller blades.

However there still remains a need for an improved axial flow combine harvester and for an improved impeller to be used in conjunction with the rotor thereof, which solves the problem of certain crops, such as hemp, being improperly fed into the rotor.

SUMMARY OF THE INVENTION

According to one aspect of the invention, there is provided an impeller for a rotor of an axial flow combine harvester. The rotor has a front end and is rotatable in a specified rotational direction during normal operation of the harvester. The impeller comprises a front, a rear and a mount for fitting the impeller on the rotor with the rear of the impeller adjacent to the front end of the rotor, and a pair of impeller blades extending radially outwards from the mount. The impeller blades are hook-shaped when viewed from the front of the impeller with outer ends projecting in the rotational direction of the rotor.

According to another aspect of the invention, there is provided a combination impeller and a rotor for an axial flow combine harvester. The rotor has a front end and is rotatable in a specified rotational direction during normal operation of the harvester. The impeller comprises a front a rear, a mount for fitting the impeller on the rotor with the rear of the impeller adjacent to the front end of the rotor, and a pair of impeller blades extending radially outwards from the mount. The impeller blades are hook-shaped when viewed from the front of the impeller with outer ends projecting in the rotational direction of the rotor.

According to a further aspect of the invention, there is provided an axial flow combine harvester having a combination impeller and a rotor. The rotor has a front end and is rotatable in a specified rotational direction during normal operation of the combine harvester. The impeller comprises a front and a rear, a mount for fitting the impeller on the rotor with the rear of the impeller adjacent to the front end of the rotor, and a pair of impeller blades extending radially outwards from the mount. The impeller blades are hook-shaped when viewed from the front of the impeller with outer ends projecting in the rotational direction of the rotor.

The invention offers significant advantages compared to prior art combine harvesters having conventional rotors and impellers for the rotors. It solves the problem of crops balling up on the rotor and instead ensures that all crops, particularly difficult crops such as hemp, feed straight through to the rotor in the axial direction of the rotor.

Moreover, this is accomplished without requiring major modifications to the combine harvester. The impeller and other components of the invention can be retrofitted to standard combine harvesters merely with a few simple tools. Typically this can be accomplished by the farmer himself. Thus considerable frustration and loss of productivity can be removed with relatively inexpensive and easy to install components.

DETAILED DESCRIPTIONS OF THE PREFERED EMBODIMENTS

Figure 1:
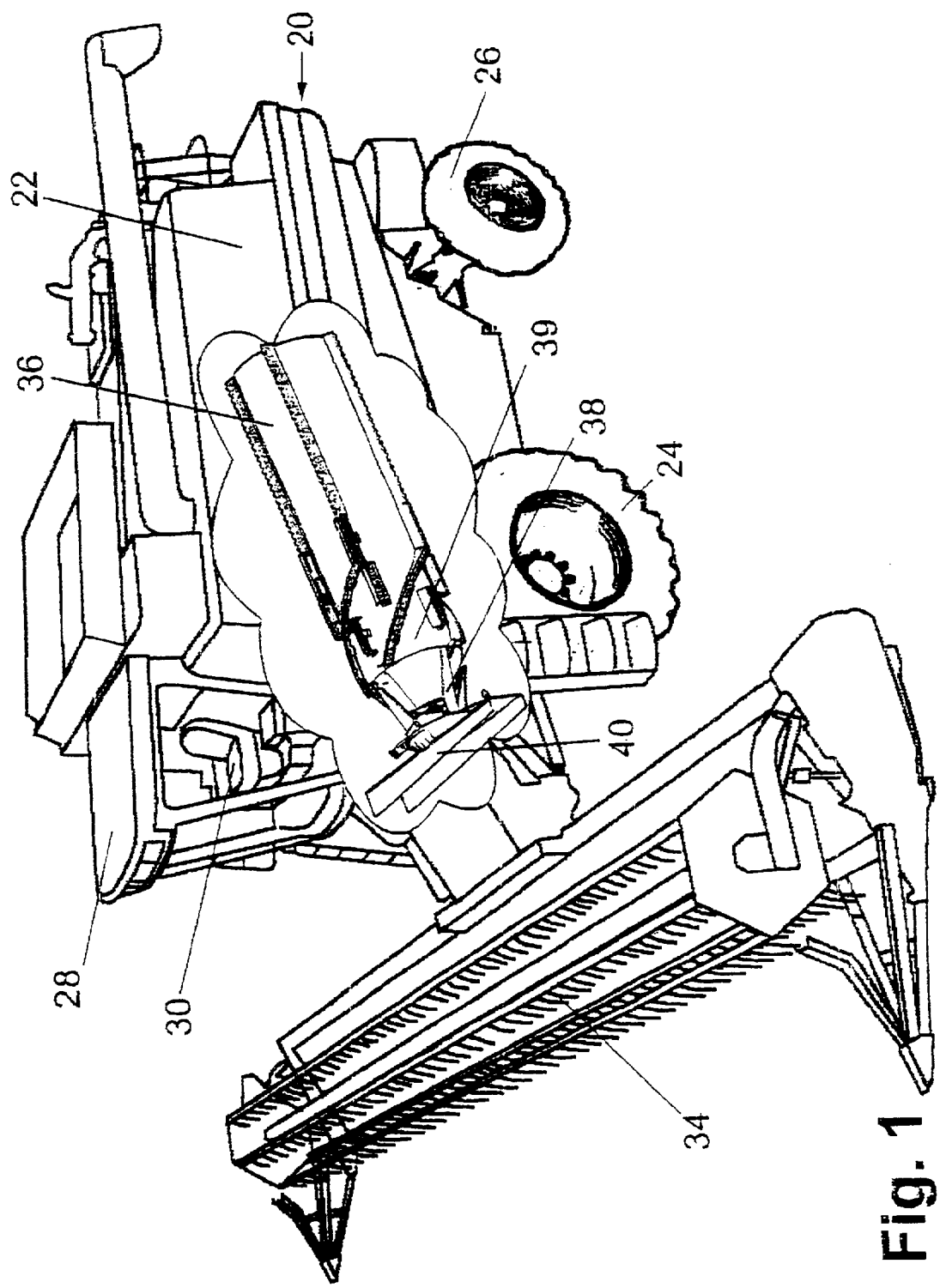
FIG. 1 is an isometric view of an axial flow combine harvester equipped with a modified impeller and hemp attachment according to embodiments of the invention.

Referring to the drawings, and first to FIG. 1, this shows an axial flow combine harvester 20 according to an embodiment of the invention. The combine harvester is generally conventional, having a body 22 supported by a front pair of wheels 24 and a rear, steerable pair of wheels 26, only one wheel of each pair being shown. There is a cab 28 having a seat 30 for the operator. A reel 34 is rotatably mounted on the front of the harvester. The harvester 20 is broken away to show internal components including rotor 36. Rotor 36 in shown in better detail in FIG. 2 and has a plurality of spiral bars 37 supported above cylindrical surface 41 thereof by a plurality of supports 42. The rotor rotates, in this case counter clockwise when viewed from the front of the harvester. Crop is cut by the reel 34 and is directed towards the rotor. The spiral bars thresh the crop as the crop passes along the rotor and the bars contact the crop. As described thus far, the harvester is conventional and accordingly will not be described in more detail except with reference to the features which differ from conventional harvesters.

Harvester 20 is equipped with impeller 38 mounted on the front 39 of the rotor. In this case the rotor is fitted with hemp attachment 40 which is optionally used when harvesting hemp. For other crops this attachment would normally be deleted although it may prove useful for some other crops. Impeller 38 directs the crop towards the rotor and the crop is threshed as it moves in the direction generally from left to right from the point of view of FIG. 1. Conventional harvesters have impellers on the front ends of the rotors, but the configuration of impeller 38 differs significantly from conventional impellers.

Figure 2:
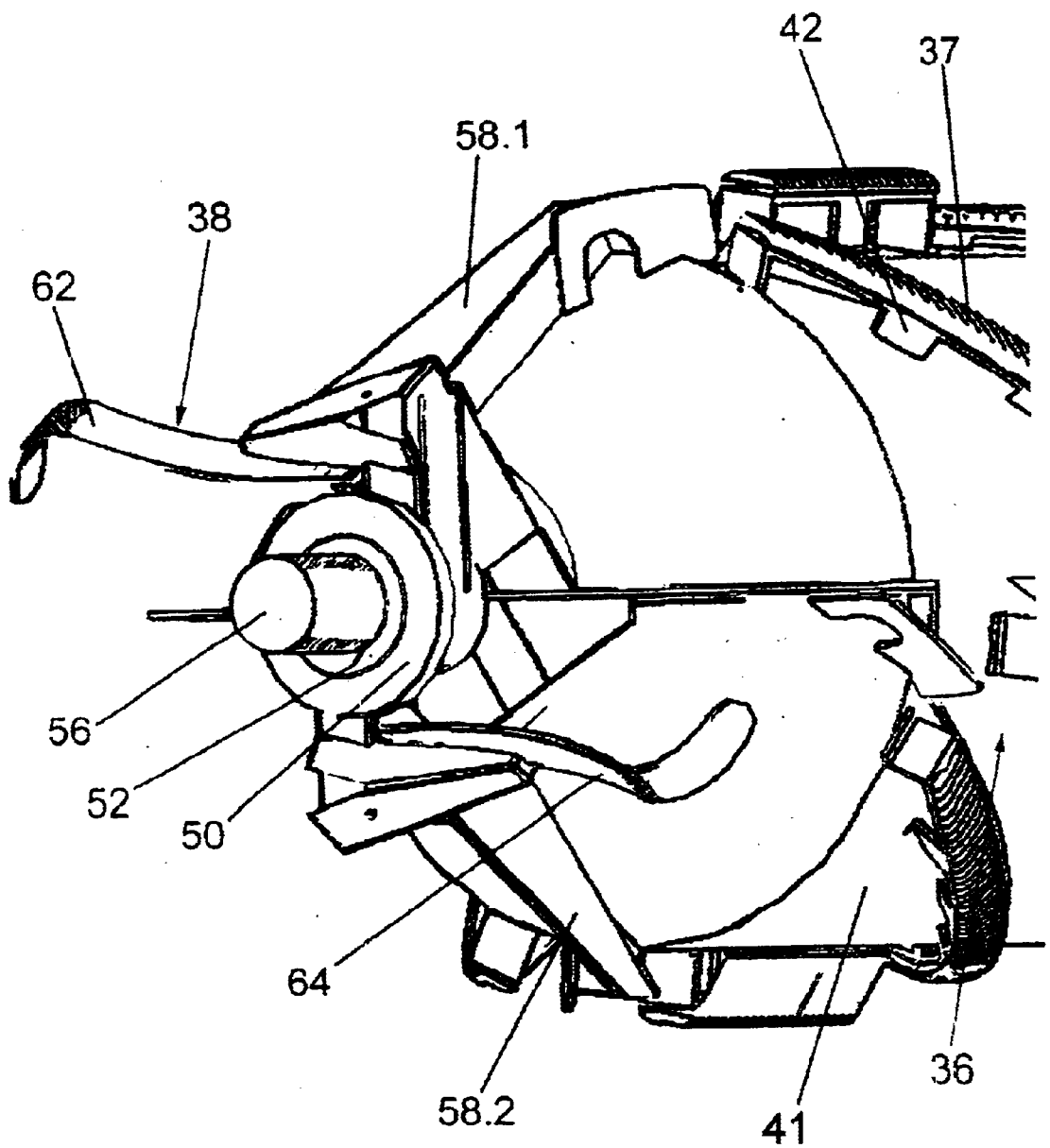
FIG. 2 is a fragmentary, isometric view of the rotor thereof with an impeller according to an embodiment of the invention fitted thereto.
Figure 3:
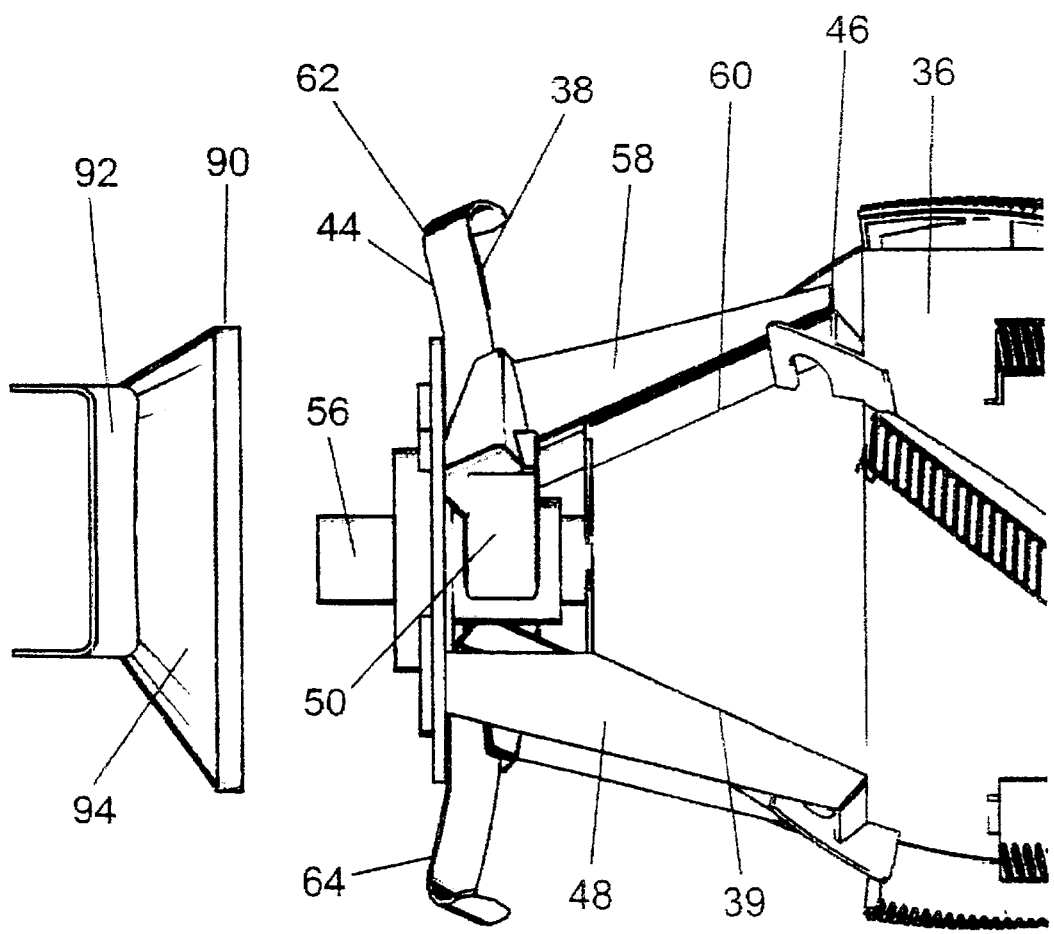
FIG. 3 is an exploded side view of the rotor and an alternative impeller fitted with a hemp attachment.

Referring to FIG. 3, impeller 38 has a front 44, a rear 46 and a mount 48 for fitting the impeller on the rotor with the rear of the impeller adjacent to front end 39 of rotor. In this example it may be seen that the front end of the rotor is conical in shape. The mount includes a cylindrical member 50 having an aperture 52, shown in FIG. 2, for receiving forwardly extending threaded shaft 56 of the rotor. The mount also includes a plurality of triangular braces 58, shown in FIG. 3, four in this example, having edges 60 which contact the front end of the rotor. A nut (not shown) is tightened on the threaded shaft to secure the impeller in place.

Figure 5:
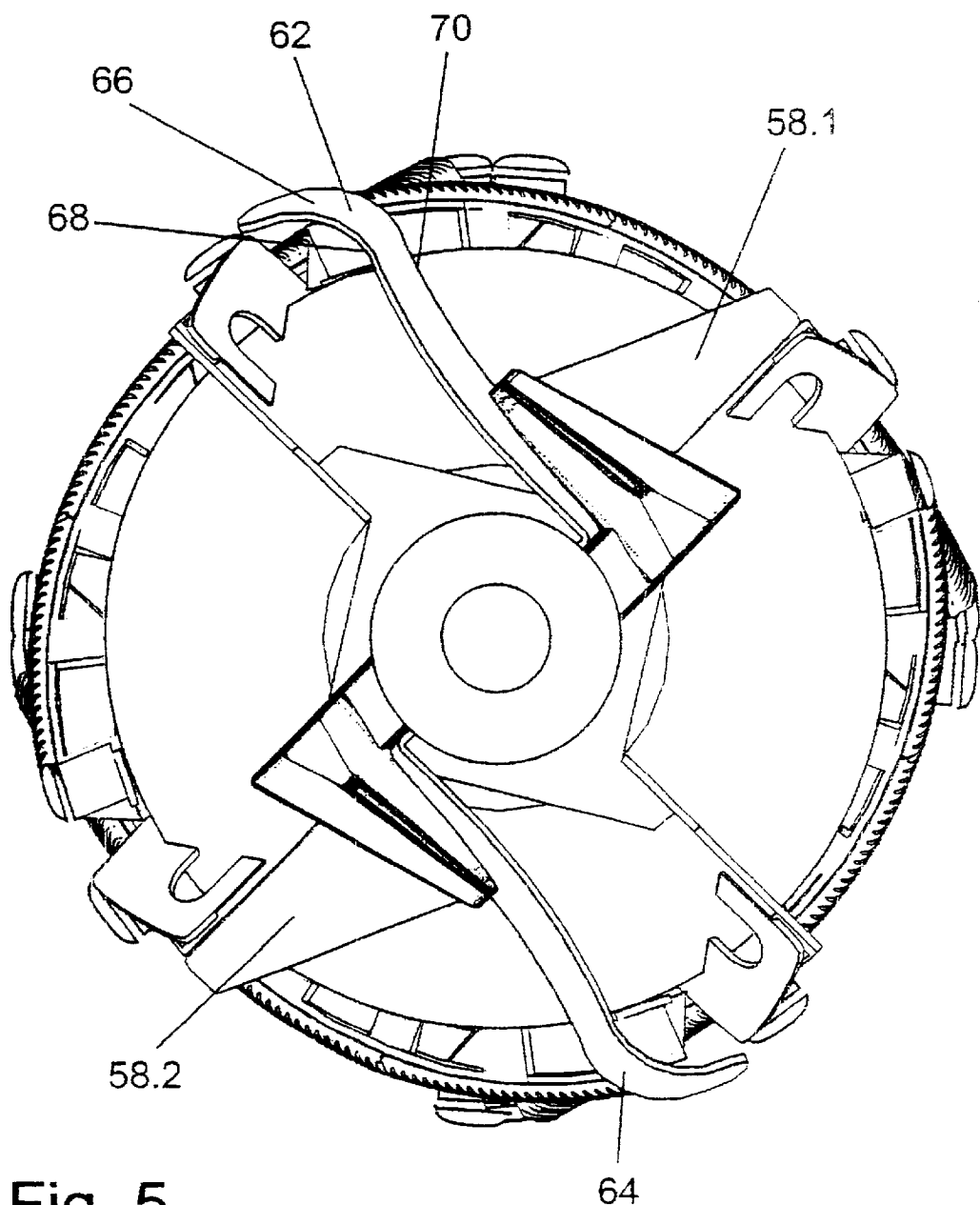
FIG. 5 is a front view of the rotor and impeller of FIG. 2.
Figure 6:
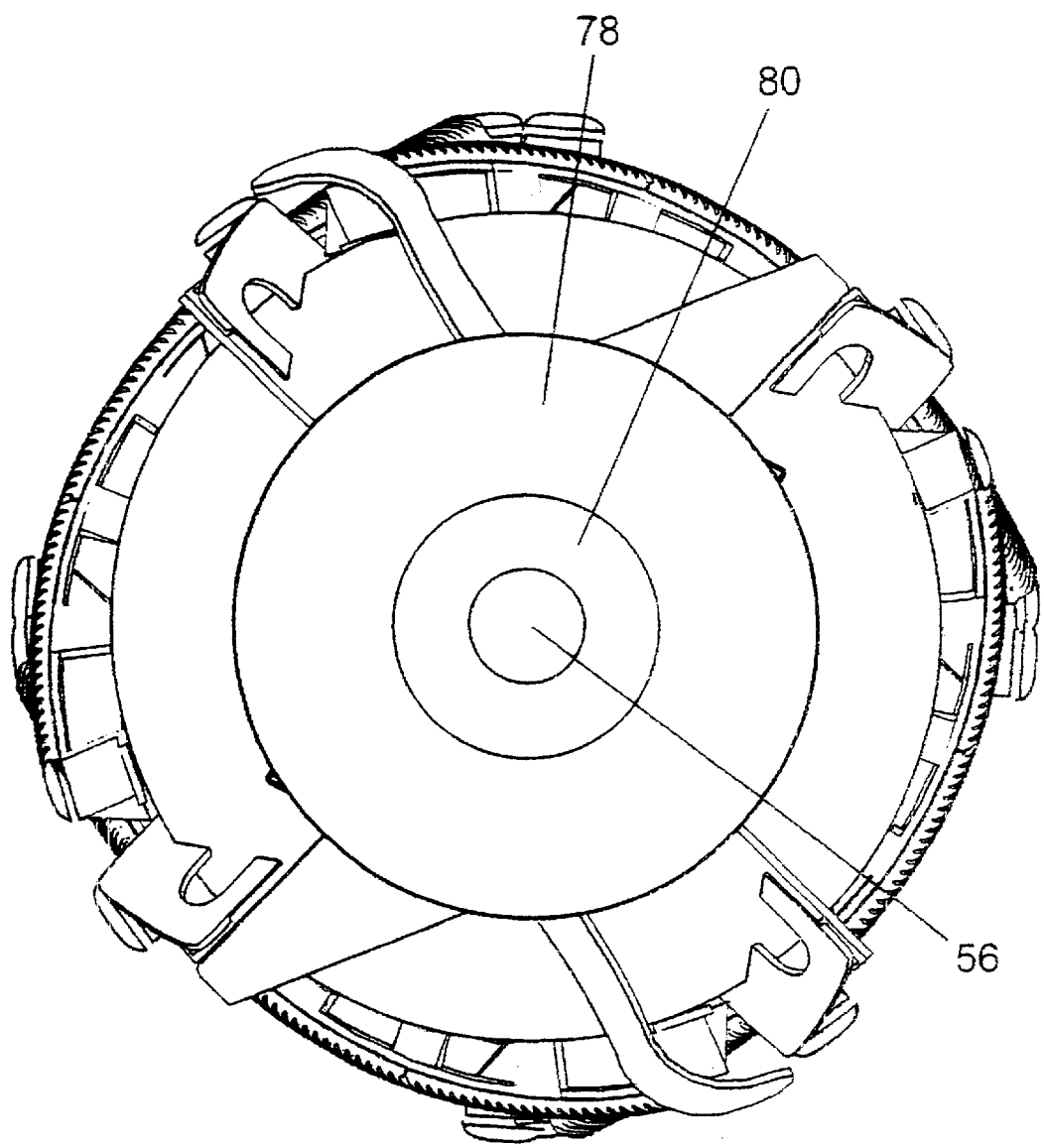
FIG. 6 is a view similar to FIG. 5 with a disk fitted on the front of the impeller.
Figure 7:
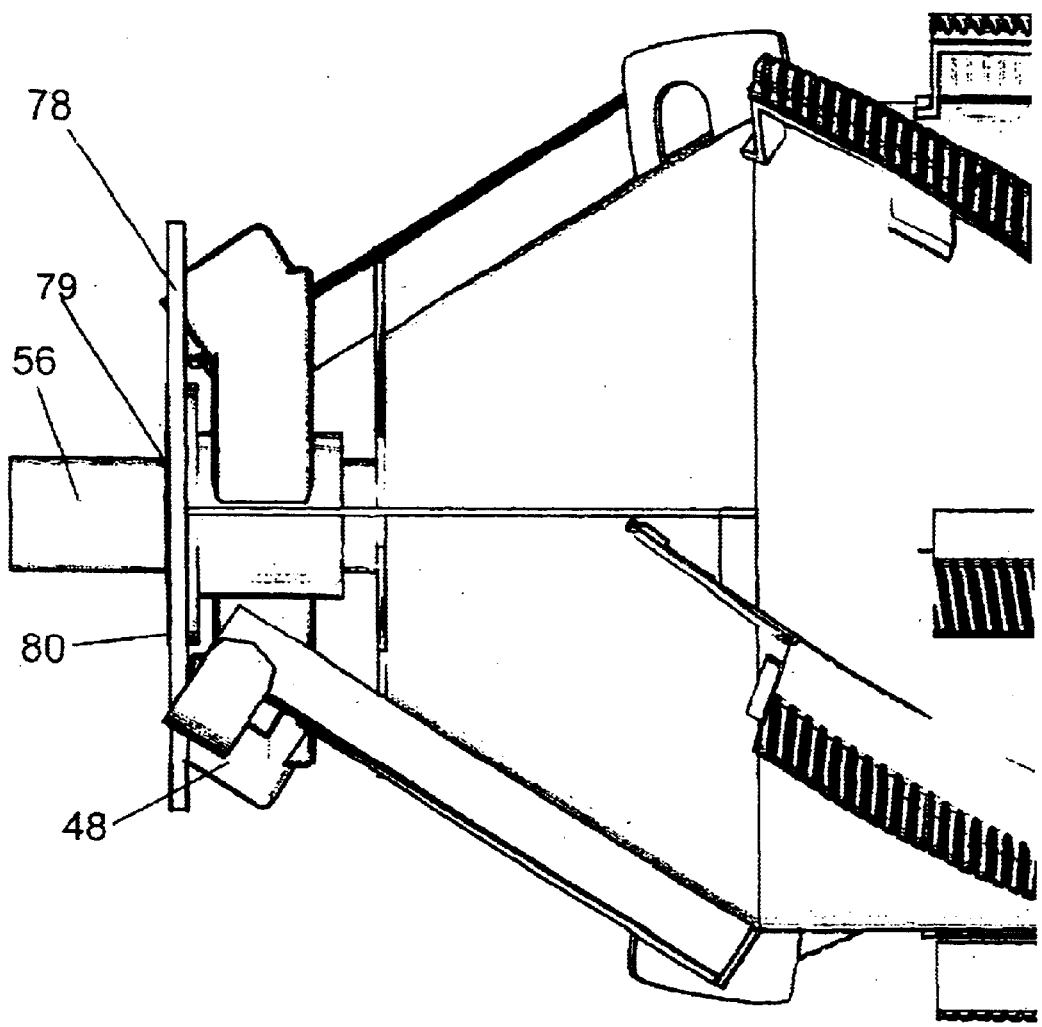
FIG. 7 is a fragmentary, side elevation thereof.

A pair of impeller blades 62 and 64 are fitted to two of the triangular braces 58.1 and 58.2 as shown best in FIGS. 2 and 5. It may be seen that the impeller blades extend radially outwards from the mount and are hook shaped when viewed from the front of the impeller as seen in FIG. 5. Each blade has an outer end 66 which projects in the direction of rotation of the rotor which is counter clockwise from the point of view of FIG. 5. Each blade has a leading edge 68 and a trailing edge 70. The leading edge is concave adjacent to the outer end 66 and the trailing edge is correspondingly convex.

Figure 8:
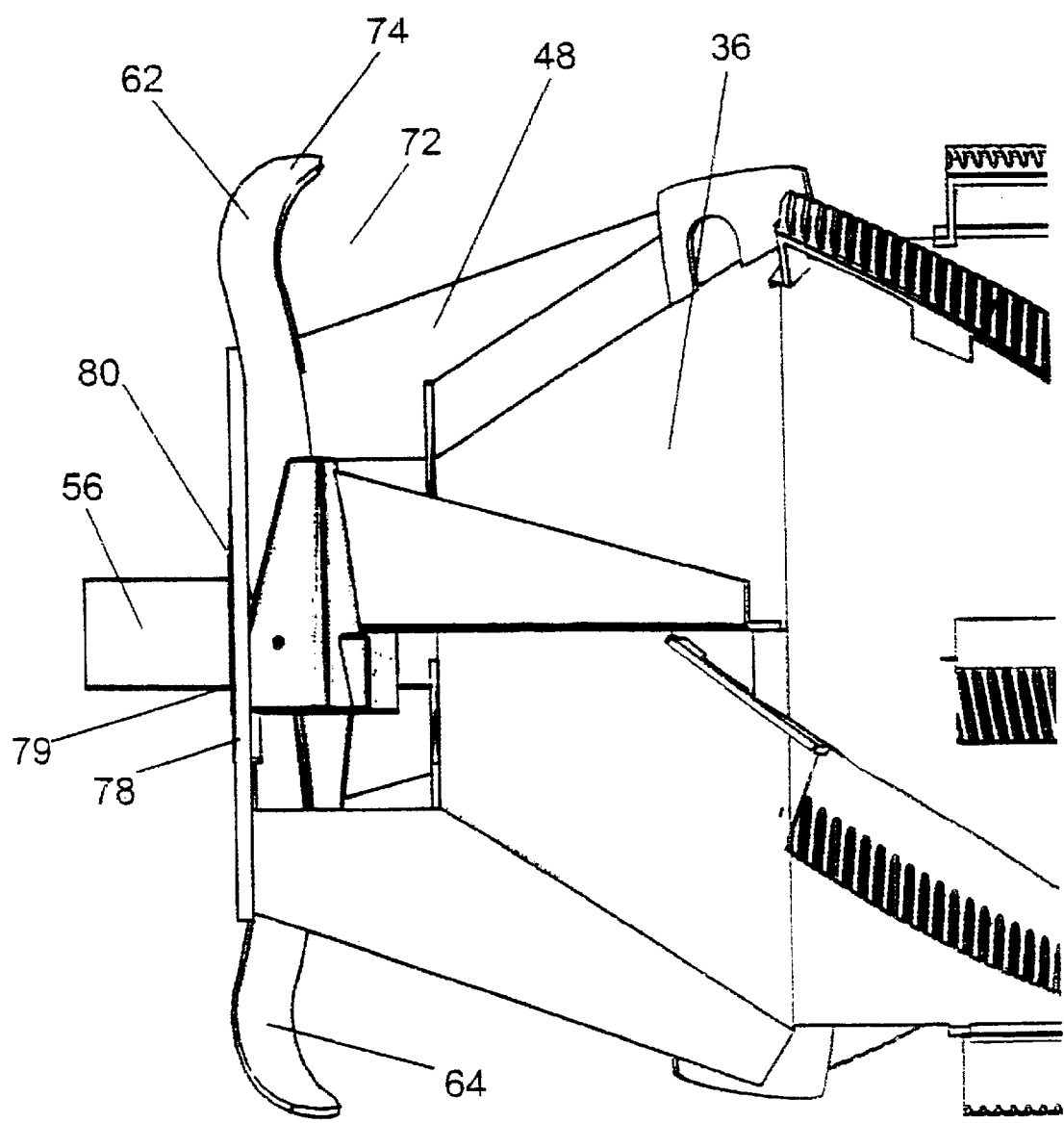
FIG. 8 is a top plan view thereof.

As seen in FIG. 8, each of the blades 62 and 64 is shaped so as to provide a space 72 between the blade and rotor 36. The space extends between outer edge 74 of the impeller to the mount 48. The space is generally U-shaped or V-shaped as may be seen.

Figure 9:
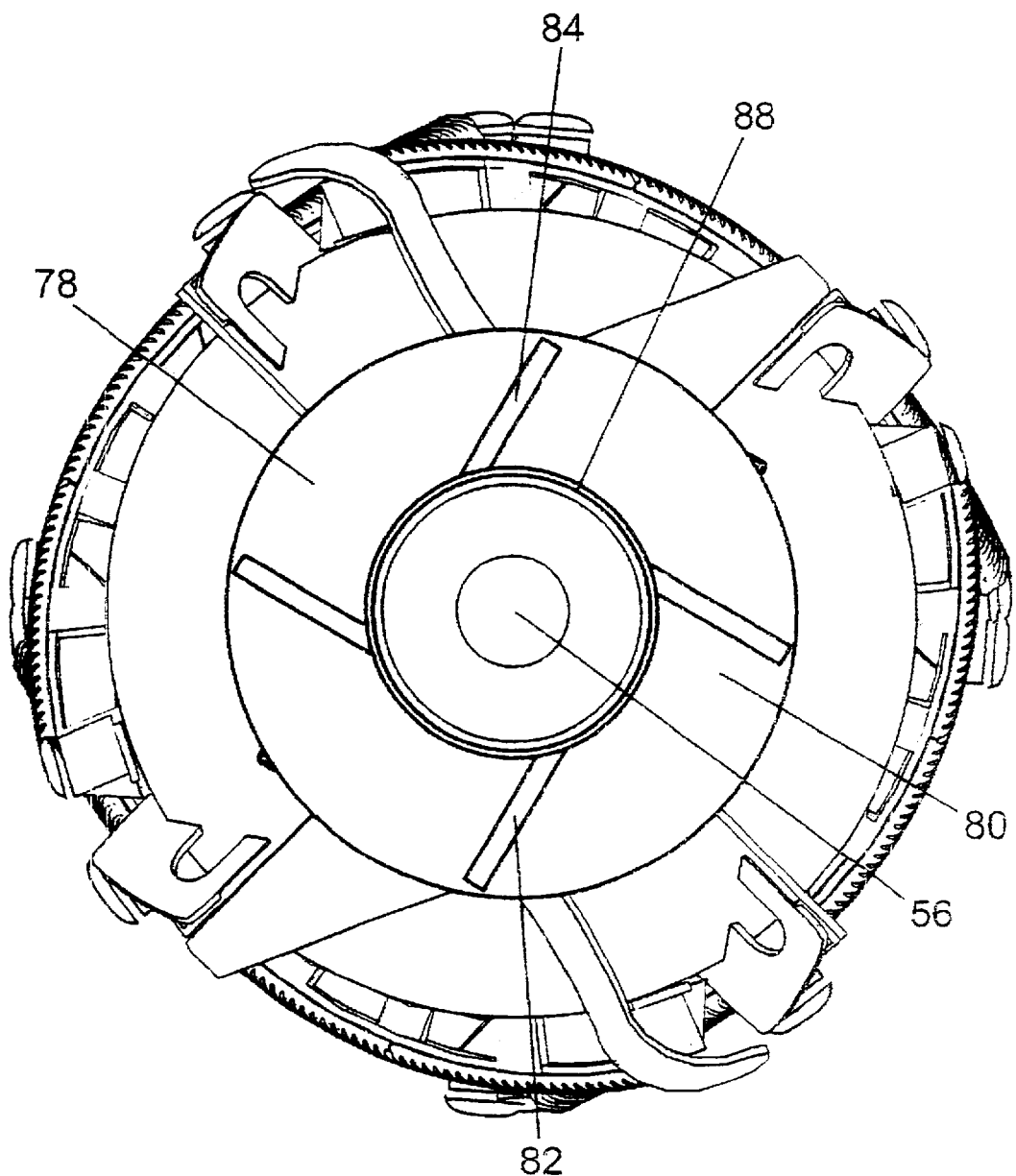
FIG. 9 is a simplified front view similar to FIG. 5, showing the embodiment of FIGS. 3 and 4 with a pair of blades mounted on the front of the disk.

A disk 78, shown in FIGS. 6–9, is fitted on the front of the rotor. The disk has a central aperture 79 which receives the shaft 56. The disk has a front 80 which is fitted with a pair of blade-like members 82 and 84 as shown in FIG. 9. In this example these blades are formed by welding angle iron onto the front of the disk. It may be observed that the blades extend generally tangentially to a circle 88 concentric with shaft 56. The blades are optional and are chiefly used for cereal crops, canola and flax.

Figure 4:
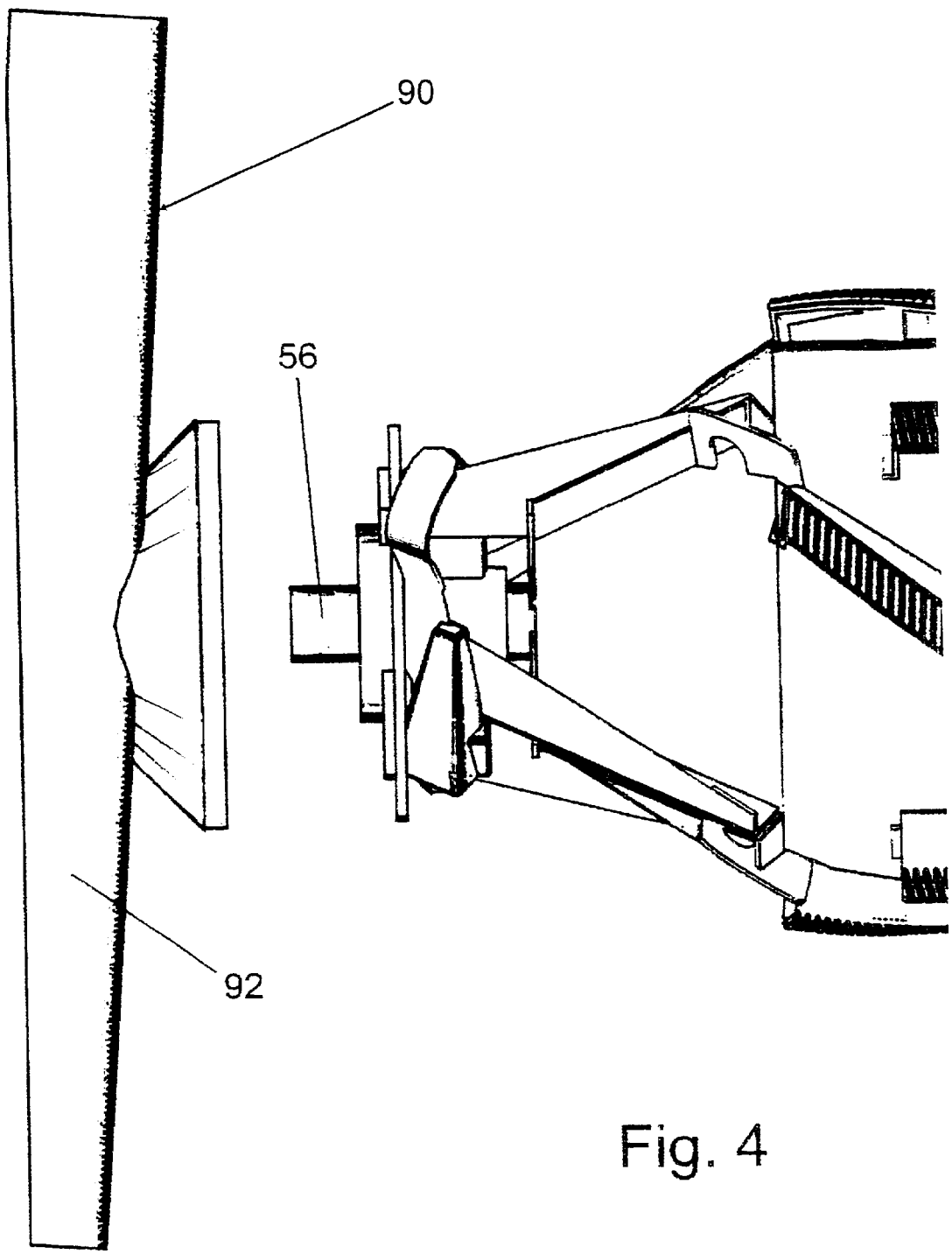
FIG. 4 is a top plan view thereof.

The impeller is optionally fitted with a hemp attachment 90 shown only in the embodiment of FIGS. 3 and 4. The hemp attachment includes a transversely extending bar 92, which in this example is a forwardly opening channel member has seen in FIG. 3. The attachment also includes a conical member 94 best shown in FIG. 3. The blade-like members 82 and 84 are removed when the hemp attachment is used. The hemp attachment includes an aperture for fitting over shaft 56.

The combine harvester is equipped with the impeller according to the invention to improve throughput and reduce or eliminate the balling effect which sometimes occurs with conventional rotors and impellers, where the crop tends to wrap about the front of the rotor instead of passing axially along the rotor for proper threshing. This problem leads to clogging in the rotor and its housing. The invention is typically used with crops such as flax, timothy, canary grass, oats and possibly rice, corn and other crops. It is also used for harvesting hemp, particularly with the hemp attachment described above.

It has been found that the installation time for the impeller on a conventional combine harvester is approximately 5–6 hours using two people to install. It can be installed using existing brackets for mounting. Therefore, the original components can be reinstalled if desired.

The modified impeller and hemp attachment allow material to flow freely through the transition area adjacent to the front end of the rotor. This eliminates or significantly reduces knotting and balling which is one of the greatest contributors to damage in the threshing chamber.

It will be understood by someone skilled in the art that many of the details provided above are by way of example only and are not intended to limit the scope of the invention which is to be interpreted with reference to the following claims.

What is claimed is:

1. An impeller for a rotor of an axial flow combine, the impeller having a rotational direction and comprising a front, a rear and a mount for fitting the impeller on the rotor and a pair of impeller blades extending radially outwards from the mount, the impeller blades being hook-shaped when viewed from the front of the impeller with outer ends projecting in the rotational direction, each said blade having a leading edge and a trailing edge, the leading edge being concave adjacent to the outer end thereof and the trailing edge being convex adjacent to the outer end thereof, the impeller blades each being shaped so as to provide a V-shaped space between said each blade and the rotor.

2. The impeller of claim 1, wherein each of the blades has a radially outer edge, the space extending from the outer edges of the blades to the mount.

3. The impeller of claim 1, including a disk on the front of the impeller, the impeller blades extending outwardly from the disk.

4. The impeller of claim 3, wherein the mount has an aperture.

5. The impeller of claim 4, wherein the disk has a central aperture, the shaft extending through the central aperture.

6. The impeller of claim 5, wherein the disk has a front and a blade outwardly from the front of the disk.

7. The impeller of claim 5, wherein the disk has a pair of blades extending outwardly from the front of the disk, the blade-like members extending tangentially with respect to a circle concentric with the shaft.

8. The impeller of claim 7, having a transversely extending bar on the front of the impeller.

9. The impeller of claim 8, wherein the bar extends radially outwards from the central aperture, the bar having a center adjacent the central aperture.

10. The impeller of claim 9 having a forwardly tapering conical member adjacent to center of the bar.

11. The impeller of claim 10, wherein the bar comprises a forwardly opening channel member.

12. A combination impeller and a rotor of an axial flow combine, the rotor having a center, conical a front end and being rotatable in a specified rotational direction during normal operation of the combine, the impeller comprising a front, a rear and a mount for fitting the impeller on the rotor with the rear of the impeller adjacent to the front end of the rotor and to the center of the rotor, and a pair of impeller blades extending radially outwards from the mount, the impeller blades being hook-shaped when viewed from the front of the impeller with outer ends projecting in the rotational direction of the rotor, each of the impeller blades having a leading edge and a trailing edge, the leading edge being concave adjacent to the outer end thereof and the trailing edge being convex adjacent to the outer end thereof, the impeller blades each being shaped so as to provide a space between said each blade and the rotor.

13. The combination of claim 12, wherein each of the blades has a radially outer edge the space extending from the outer edges of the blades to the mount.

14. The combination of claim 12, including a disk on the front on the front of the impeller, the impeller blades extending outwardly from the disk.

15. The combination of claim 14, wherein the rotor has a forwardly extending shaft, the mount having an aperture with the shaft extending through the aperture.

16. The combination of claim 15, wherein the disk has a central aperture, the shaft extending through the central aperture.

17. The combination of claim 16, wherein the disk has a front and a blade extending outwardly from the front of the disk.

18. The combination of claim 16, wherein the disk has a pair of blades extending outwardly from the front of the disk, the blade-like members extending tangentially with respect to a circle concentric with the shaft.

19. The combination of claim 14, having a transversely extending bar on the front of the impeller.

20. The combination of claim 19, wherein the bar extends radially outwards from the central aperture, the bar having a center adjacent the central aperture.

21. The combination of claim 20 having a forwardly tapering conical member adjacent to center of the bar.

22. The combination of claim 21, wherein the bar comprises a forwardly opening channel member.

23. An axial flow combine harvester having a combination impeller and a rotor, the rotor having a center, a conical front end and being rotatable in a specified rotational direction during normal operation of the combine harvester, the impeller comprising a front, a rear and a mount for fitting the impeller on the rotor with the rear of the impeller adjacent to the front end of the rotor and to the center of the rotor, and a pair of impeller blades extending radially outwards from the mount, the impeller blades being hook-shaped when viewed from the front of the impeller with outer ends projecting in the rotational direction of the rotor, each of the impeller blades having a leading edge and a trailing edge, the leading edge being concave adjacent to the outer end thereof and the trailing edge being convex adjacent to the outer end thereof, the impeller blades each being shaped so as to provide a space between said each blade and the rotor.

24. The combine of claim 23, wherein each of the blades has a radially outer edge, the space extending from the outer edges of the blades to the mount.

25. The combine of claim 23, including a disk on the front of the rotor, the impeller blades extending outwardly from the disk.

26. The combine of claim 25, wherein the rotor has a forwardly extending shaft, the mount having an aperture with the shaft extending through the aperture.

27. The combine of claim 26, wherein the disk has a central aperture, the shaft extending through the central aperture.

28. The combine of claim 27, wherein the disk has a front and a blade extending outwardly from the front of the disk.

29. The combine of claim 27, wherein the disk has a pair of blades extending outwardly from the front of the disk, the blade-like members extending tangentially with respect to a circle concentric with the shaft.

30. The combine of claim 29, having a transversely extending bar on the front of the impeller.

31. The combine of claim 30, wherein the bar extends radially outwards from the central aperture, the bar having a center adjacent the central aperture.

32. The combine of claim 31, having a forwardly tapering conical member adjacent to center of the bar.

33. The combine of claim 32, wherein the bar comprises a forwardly opening channel member.

* * * * *